Patented Feb. 9, 1937

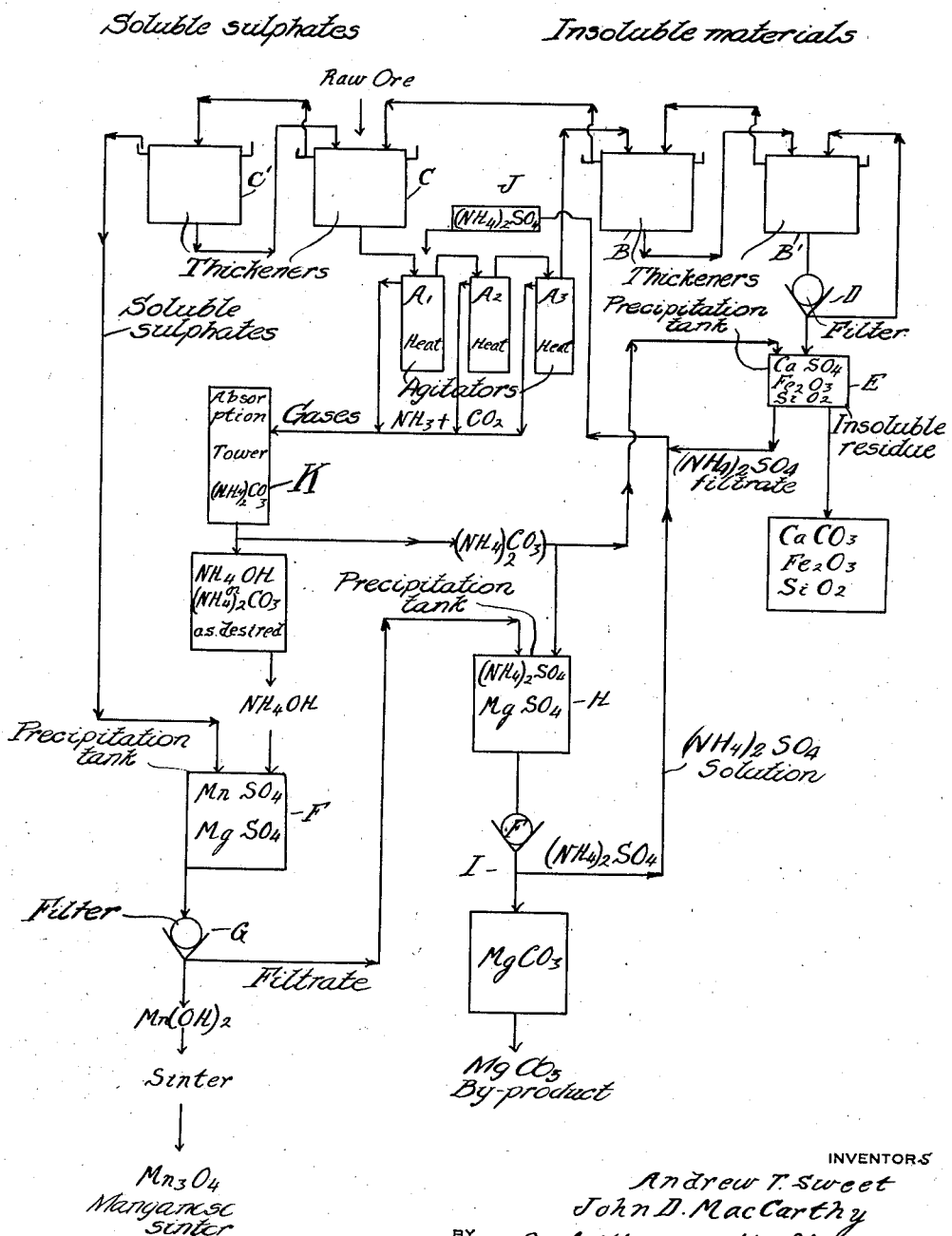

2,070,497

UNITED STATES PATENT OFFICE 2,070,497

PROCESS OF OBTAINING MANGANESE VALUES FROM ORES CONTAINING THEM

Andrew T. Sweet, Houghton, and John D. MacCarthy, Detroit, Mich., assignors to General Manganese Corporation, Detroit, Mich., a corporation of Delaware Application September 23, 1929, Serial No. 394,677
Renewed June 26, 1935

10 Claims. (Cl. 23—145)

The invention relates to the extraction of metals from ores and has for its object the obtaining of a process applicable to the economical treatment of relatively low grade ores containing various metals in the form of oxides, carbonates or other water insoluble compounds. The broad features of our invention are applicable to various specific processes, but the present case is directed to only one of these in which the desired constituents of the ore are in the form of carbonates and are rendered water soluble by leaching with a specific reagent, viz: ammonium sulphate. As an example of ore which may be treated, the following represents the average general approximate analysis of a low grade manganese carbonate ore found in South Dakota:

| | | Per cent |
|---|---|---|
| Dried 212° F. | Mn | 16.00 |
| | Fe | 11.00 |
| | P | .429 |
| | $SiO_2$ | 13.00 |
| | MgO | 1.80 |
| | CaO | 15.00 |
| | $Al_2O_3$ | 2.70 |
| | $CO_2$ loss | 28.00 |
| | Approximate loss on ignition | 6.00 |

As illustrated by the flow sheet in the accompanying drawing, the crushed ore is first treated with a water solution of ammonium sulphate, this step being carried out in agitators A', $A^2$, $A^3$, the solution being preferably kept at substantially boiling temperature, preferably boiling to evolve steam which assists in carrying off the ammonia gas. In these agitators the manganese, calcium and magnesium which were originally carbonates are converted into sulphates with the evolution of ammonia gas ($NH_3$) and carbon dioxide gas ($CO_2$). These gases are collected in the usual manner in an absorption tower K forming ammonium carbonate $$(NH_4)_2CO_3.$$

In the next step the solution and residue are passed to B where the liquid is separated from the solid, the solution passing on to C and the solids to B', thence after washing and filtration at D to waste E, this containing the iron, silica, calcium sulphate and other insoluble constituents.

The solution entering C contains manganese sulphate and magnesium sulphate. Should any of the iron be converted into a sulphate this may be eliminated by the introduction of raw ore to the solution at C which decomposes the sulphate to iron oxide, the acid radical attacking the manganese, magnesium and calcium carbonates to form sulphates. The ore after treatment in C passes to the agitators A', $A^2$, $A^3$ above described, and thus the iron content eventually finds its way into the residue.

The next step in the process is that of precipitating the desired metal compound and/or the separation or differential precipitation of the desired metal compounds, which procedure depends entirely upon the elements present, their respective quantities, and their respective solubilities or insolubilities, as they might occur in the ore being treated. For example, in the processing of the ores cited above the following procedure would be preferably as has been outlined on the accompanying flow sheet.

The sulphate solution freed from most of the iron passes from C to C' and thence to F where the manganese is precipitated. The precipitant used is preferably ammonium hydroxide $NH_4OH$ which is derived from a portion of the ammonium carbonate (by the action of calcium oxide) to precipitate the manganese hydroxide without affecting the other sulphates in solution. After filtration at G the solution is passed to H in which it is treated by ammonium carbonate precipitating magnesium carbonate $MgCO_3$. This leaves in the solution only ammonium sulphate which has been reformed as a result of the several precipitations. Thus after filtration at I the ammonium sulphate solution is returned to J from which it again passes to A', $A^2$, $A^3$.

The manganese hydroxide $Mn(OH)_2$ is sintered to produce manganese manganic oxide $Mn_3O_4$. The magnesium carbonate removed by the filter I may be calcined forming magnesium oxide MgO and carbon dioxide, $CO_2$.

While the above procedure is preferable in treating the ores specifically used for an example of the process, it is within the scope of the invention to treat other manganese ores containing the same or other associated minerals present in the same quantities or present in variable quantities, or as less soluble compounds, or as insoluble compounds. It is obvious at once that minor changes in the manner and methods of precipitation are necessary to precipitate the desired metal compounds or to effect a differential precipitation as desired.

As a further example of this feature, it will be noted by reference to the flow sheet that provision has been made for the alternative use of ammonium hydroxide or ammonium carbonate as desired in the tank F containing the soluble sulphates for the reason that it may be desirable to precipitate the manganese and magnesium or other soluble compounds in a single precipitation step. In an ore containing magnesium and lime as insolubles, or as solubles in small quantities, or one containing no magnesium and lime at all, the flow sheet would be simplified in that the soluble manganese sulphates containing some, or no other soluble sulphates would be treated with an ammonium compound derived from at least one of the said gases in a single precipitation step. In this case the manganese compound is precipitated along with or without such quantities of magnesium compounds and other associated compounds present in the particular ore as soluble constituents. The single precipitation thereby reforms the ammonium sulphate. Other deviations made necessary through the use of ammonium chloride as the reagent instead of ammonium sulphate due to the variation in the different solubilities of the metal chloride compounds may be had by reference to our co-pending application, Serial No. 392,983, filed September 16, 1929.

It will be noted that in the complete cycle the end products do not contain any portion of the reagent ammonium sulphate which was used for the first step of the process. Further, that the precipitants used in the succeeding steps are derived from the ammonium sulphate and eventually are re-converted thereinto. Thus the process is completely cyclic.

To regenerate ammonium sulphate from the calcium sulphate the gangue is treated with a solution of the ammonium carbonate to form calcium carbonate and ammonium sulphate.

What we claim as our invention is:

1. The process of recovering manganese and magnesium compounds from carbonate ores which consists in treating the ore at substantially boiling temperatures with a solution of ammonium sulphate to convert the carbonates into sulphates resulting in the evolution of ammonia and carbon dioxide gases, collecting and combining these gases to form ammonium carbonate, separating the soluble sulphates from the insoluble gangue, precipitating a manganese compound from the solution by ammonium hydroxide and separating the solution therefrom, precipitating a magnesium compound by ammonium carbonate and utilizing the reformed ammonium sulphate resulting from both of said precipitations for repeating the cycle.

2. The process of recovering manganese compounds from carbonate ores containing manganese and iron compounds comprising treating the ore with a solution of ammonium sulphate at substantially boiling temperature, thereby forming a solution of manganese sulphate resulting in the evolution of ammonia and carbon dioxide, separating the soluble sulphates from the insoluble gangue containing the iron in the form of an insoluble compound, and treating said manganese sulphate solution with ammonium hydroxide, thereby precipitating an insoluble manganese compound.

3. The process of recovering manganese compounds from carbonate ores which comprises treating the ore with a solution of ammonium sulphate at substantially boiling temperatures to form soluble manganese sulphate and resulting in the evolution of ammonia and carbon dioxide gases and separating and recovering soluble manganese sulphate from the insoluble residue.

4. The process of recovering manganese compounds from carbonate ores which comprises treating the ore with a solution of ammonium sulphate at substantially boiling temperatures to form soluble manganese sulphate and resulting in the evolution of ammonia and carbon dioxide gases, separating the soluble manganese sulphate from the insoluble residue and precipitating an insoluble manganese compound from said solution.

5. The process of recovering manganese compounds from carbonate ores which comprises treating the ore with a solution of ammonium sulphate at substantially boiling temperatures to form soluble manganese sulphate and resulting in the evolution of ammonia and carbon dioxide gases, separating the soluble manganese sulphate from the insoluble residue, precipitating an insoluble manganese compound from the solution with an ammonium compound derived from at least one of the said gases capable of forming an insoluble manganese compound and reforming ammonium sulphate and separating and recovering the same in order to repeat the cycle.

6. The process of recovering manganese and magnesium compounds from carbonate ores which comprises treating the ore with a solution of ammonium sulphate at substantially boiling temperatures to form the soluble sulphates of manganese and magnesium and resulting in the evolution of ammonia and carbon dioxide gases, separating the soluble sulphates from the insoluble compounds, precipitating insoluble manganese and magnesium compounds from the solution with an ammonium compound derived from at least one of said gases thereby reforming ammonium sulphate and separating and recovering the ammonium sulphate in order to repeat the cycle.

7. The process of recovering manganese compounds from carbonate ores containing manganese carbonate, iron and insoluble compounds which comprises treating the ore with a solution of ammonium sulphate at substantially boiling temperatures to form soluble manganese sulphate and resulting in the evolution of ammonia and carbon dioxide gases, separating the soluble manganese sulphate from the insoluble residue, precipitating a manganese compound from the solution with an ammonium compound derived from at least one of said gases capable of forming an insoluble manganese compound and reforming ammonium sulphate and separating and recovering the same in order to repeat the cycle.

8. The process of recovering metal compounds from carbonate ores containing manganese and magnesium cabonates which comprises treating the ore with a solution of ammonium sulphate at substantially boiling temperatures to form the soluble sulphates of manganese and magnesium and resulting in the evolution of ammonia and carbon dioxide gases, separating the soluble sulphates from the insoluble residue, precipitating insoluble manganese hydroxide from the solution with ammonium hydroxide derived from said gases thereby reforming ammonium sulphate, separating and treating the remaining soluble sulphates of magnesium and ammonium with ammonium carbonate derived from said ammonia and carbon dioxide gases to precipitate insoluble magnesium carbonate and to reform ammonium sulphate and separating and recovering the ammonium sulphate resulting from the several precipitations in order to repeat the cycle.

9. The process of recovering metal compounds from carbonate ores containing manganese and magnesium carbonates, iron and insoluble compounds which comprises treating the ore with a solution of ammonium sulphate at substantially boiling temperatures to form the soluble sulphates of manganese and magnesium and resulting in the evolution of ammonia and carbon dioxide gases, separating the soluble sulphates from the insoluble residue, precipitating insoluble manganese hydroxide from the solution with ammonium hydroxide derived from said gases thereby reforming ammonium sulphate, separating and treating the remaining soluble sulphates of magnesium and ammonium with ammonium carbonate derived from said ammonia and carbon dioxide gases to precipitate insoluble magnesium carbonate and to reform ammonium sulphate and separating and recovering the ammonium sulphate resulting from the several precipitations in order to repeat the cycle.

10. The process of recovering metal compounds from carbonate ores containing manganese, magnesium and calcium carbonates, iron and insoluble compounds which comprises treating the ore with a solution of ammonium sulphate at substantially boiling temperatures to form the soluble sulphates of manganese and magnesium, resulting in the evolution of ammonia and carbon dioxide gases, separating the soluble sulphates from the insoluble residue, precipitating insoluble manganese hydroxide from the solution with ammonium hydroxide derived from said gases thereby reforming ammonium sulphate, separating and treating the remaining solution with ammonium carbonate derived from said ammonia and carbon dioxide gases to precipitate insoluble magnesium carbonate thereby reforming ammonium sulphate, separating and treating the insoluble calcium sulphate in the first residue with ammonium carbonate derived from said ammonia and carbon dioxide gases to form calcium carbonate thereby reforming ammonium sulphate and separating and recovering the ammonium sulphate resulting from the several precipitations in order to repeat the cycle.

ANDREW T. SWEET.
JOHN D. MacCARTHY.